(12) United States Patent
Bankoski et al.

(10) Patent No.: US 10,469,841 B2
(45) Date of Patent: Nov. 5, 2019

(54) MOTION VECTOR PREDICTION USING PRIOR FRAME RESIDUAL

(71) Applicant: GOOGLE LLC, Mountain View, CA (US)

(72) Inventors: James Bankoski, Los Gatos, CA (US); Debargha Mukherjee, Cupertino, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 564 days.

(21) Appl. No.: 15/010,594

(22) Filed: Jan. 29, 2016

(65) Prior Publication Data

US 2017/0223357 A1 Aug. 3, 2017

(51) Int. Cl.
| | |
|---|---|
| *H04N 19/132* | (2014.01) |
| *H04N 19/186* | (2014.01) |
| *H04N 19/182* | (2014.01) |
| *H04N 19/593* | (2014.01) |
| *H04N 19/117* | (2014.01) |

(Continued)

(52) U.S. Cl.
CPC ......... *H04N 19/132* (2014.11); *H04N 19/105* (2014.11); *H04N 19/117* (2014.11); *H04N 19/119* (2014.11); *H04N 19/124* (2014.11); *H04N 19/137* (2014.11); *H04N 19/176* (2014.11); *H04N 19/182* (2014.11); *H04N 19/186* (2014.11); *H04N 19/44* (2014.11); *H04N 19/52* (2014.11); *H04N 19/543* (2014.11); *H04N 19/593* (2014.11); *H04N 19/61* (2014.11)

(58) Field of Classification Search
CPC .. H04N 19/132; H04N 19/593; H04N 19/117; H04N 19/124; H04N 19/61; H04N 19/182; H04N 19/44; H04N 19/52; H04N 19/186; H04N 19/105; H04N 19/543; H04N 19/137; H04N 19/119; H04N 19/176
See application file for complete search history.

(56) References Cited

U.S. PATENT DOCUMENTS

| | | |
|---|---|---|
| 5,103,488 A | 4/1992 | Gemello et al. |
| 5,177,608 A | 1/1993 | Ohki et al. |

(Continued)

FOREIGN PATENT DOCUMENTS

| | | |
|---|---|---|
| CN | 102939754 A | 2/2013 |
| CN | 102845062 B | 4/2015 |

(Continued)

OTHER PUBLICATIONS

Ohm, Jens-Rainer. "Multimedia Signal Coding and Transmission." Springer 2015.*

(Continued)

*Primary Examiner* — Gims S Philippe
*Assistant Examiner* — Stefan Gadomski
(74) *Attorney, Agent, or Firm* — Young Basile Hanlon & MacFarlane, P.C.

(57) ABSTRACT

A mask is generated from a residual that is a difference between pixel values of at least two frames other than a current frame in a video sequence. The mask is then used to encode or decode a current block by inter-prediction. The mask forms an edge of an object within its bounds and can be used to combine different portions of a reference frame into a single block. This can increase coding efficiency.

19 Claims, 7 Drawing Sheets

(51) Int. Cl.

| | | |
|---|---|---|
| H04N 19/44 | (2014.01) | |
| H04N 19/176 | (2014.01) | |
| H04N 19/105 | (2014.01) | |
| H04N 19/119 | (2014.01) | |
| H04N 19/137 | (2014.01) | |
| H04N 19/543 | (2014.01) | |
| H04N 19/124 | (2014.01) | |
| H04N 19/52 | (2014.01) | |
| H04N 19/61 | (2014.01) | |

(56) References Cited

U.S. PATENT DOCUMENTS

| | | | |
|---|---|---|---|
| 5,274,453 A | 12/1993 | Maeda | |
| 5,469,226 A | 11/1995 | David et al. | |
| 5,969,772 A | 10/1999 | Saeki | |
| 6,404,813 B1 | 6/2002 | Haskell et al. | |
| 6,614,847 B1 | 9/2003 | Das et al. | |
| 7,756,348 B2 * | 7/2010 | Mukherjee | H04N 19/105 348/699 |
| 8,358,691 B1 | 1/2013 | Wang et al. | |
| 8,675,736 B2 | 3/2014 | Huang et al. | |
| 8,681,855 B2 | 11/2014 | Yin et al. | |
| 9,986,236 B1 * | 5/2018 | Mukherjee | H04N 19/00696 |
| 2002/0015513 A1 * | 2/2002 | Ando | H04N 19/139 382/107 |
| 2003/0067978 A1 * | 4/2003 | Pirim | G06T 7/254 375/240.03 |
| 2004/0247192 A1 * | 12/2004 | Kajiki | H04N 19/176 382/239 |
| 2006/0008118 A1 * | 1/2006 | Matsuoka | G06K 9/00711 382/103 |
| 2008/0304569 A1 | 12/2008 | Lee et al. | |
| 2009/0320081 A1 | 12/2009 | Chui et al. | |
| 2011/0109753 A1 * | 5/2011 | Srinivasamurthy | H04N 19/46 348/208.4 |
| 2011/0134998 A1 * | 6/2011 | Lee | H04N 19/50 375/240.12 |
| 2011/0200111 A1 | 8/2011 | Chen et al. | |
| 2012/0147961 A1 | 6/2012 | Guo et al. | |
| 2012/0300850 A1 * | 11/2012 | Yie | H04N 19/105 375/240.16 |
| 2012/0307910 A1 * | 12/2012 | Srinivasan | H04N 19/70 375/240.24 |
| 2013/0034166 A1 * | 2/2013 | Shiodera | H04N 19/105 375/240.16 |
| 2013/0039423 A1 | 2/2013 | Helle et al. | |
| 2013/0089265 A1 * | 4/2013 | Yie | G06T 9/004 382/238 |
| 2013/0101039 A1 * | 4/2013 | Florencio | H04N 19/176 375/240.16 |
| 2013/0128979 A1 * | 5/2013 | Jones | H04N 19/00 375/240.16 |
| 2013/0251039 A1 * | 9/2013 | Drugeon | H04N 19/176 375/240.14 |
| 2013/0279591 A1 | 10/2013 | Ratner et al. | |
| 2013/0287109 A1 | 10/2013 | Wang et al. | |
| 2013/0287116 A1 | 10/2013 | Helle et al. | |
| 2013/0329800 A1 * | 12/2013 | Mironovich | H04N 19/543 375/240.16 |
| 2014/0079320 A1 * | 3/2014 | Hamming | G06K 9/00671 382/190 |
| 2014/0226721 A1 * | 8/2014 | Joshi | H04N 19/159 375/240.13 |
| 2015/0189272 A1 | 7/2015 | Peng et al. | |
| 2016/0050411 A1 * | 2/2016 | Wang | H04N 19/00733 375/240.16 |
| 2016/0080764 A1 * | 3/2016 | Bae | H04N 19/176 375/240.03 |
| 2016/0140699 A1 * | 5/2016 | Dhawan | G06K 9/4604 382/195 |
| 2016/0182915 A1 * | 6/2016 | Lee | H04N 19/521 375/240.08 |
| 2016/0269725 A1 * | 9/2016 | Mrak | H04N 19/132 |
| 2017/0013279 A1 | 1/2017 | Puri et al. | |
| 2017/0223357 A1 | 8/2017 | Bankoski et al. | |
| 2017/0280144 A1 * | 9/2017 | Dvir | H04N 19/176 |
| 2018/0176559 A1 * | 6/2018 | Lee | H04N 19/597 |

FOREIGN PATENT DOCUMENTS

| | | | | |
|---|---|---|---|---|
| CN | 105 165 012 A | | 12/2015 | |
| EP | 2280550 A1 * | | 2/2011 | H04N 7/50 |
| EP | 2597872 A2 | | 5/2013 | |
| GB | 2546886 A | | 8/2017 | |
| JP | S62-104283 A | | 5/1987 | |
| WO | 2012042654 A1 | | 4/2012 | |

OTHER PUBLICATIONS

Ohm, Jens-Rainer. "Multimedia Signal Coding and Transmission." Springer Mar. 2015.*

Combined Search and Examination report in corresponding foreign Application No. GB1621550.1, dated May 22, 2017.

Bankoski et al., "Technical Overview of VP8, An Open Sourse Video Codec for the Wed". Dated Jul. 11, 2011.

Bankoski et al., "VP8 Data Format and Decoding Guide" Independent Submission. RFC 6389, Dated Nov. 2011.

Bankoski et al., "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Mozilla, "Introduction to Video Coding Part 1: Transform Coding", Video Compression Overview, Mar. 2012, 171 pp.

Overview; VP7 Data Format and Decoder. Version 1.5. On2 Technologies, Inc. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

(56) References Cited

OTHER PUBLICATIONS

McCann et al., "Samsung's Response to the Call for Proposals on Video Compression Technology," Document JCTVC-A124, JCT-VC Meeting, Apr. 15-23, 2010 (Dresden, DE), 42 pp.
Cheng et al., "Merge Mode Based Fast Inter Prediction for HEVC," 2015 Visual Communication and Image Processing (VCIP), IEEE, Dec. 13, 2015, 4 pp.
Examination report in corresponding CA Patent Application No. 3,001,888, dated Feb. 123, 2019, 7 pgs.
Park, Ju Hyun, et al., "The Shape-Based Motion Estimation Using Frame Differences for MCFI," Proceedings of 2009 International Conference on Computer Engineering & Systems, Dec. 16, 2009, pp. 397-402.
First Office Action in corresponding Chinese Patent Application for Invention No. 201611234686.6, dated May 29, 2019, and its English translation, 30 pgs.
First Office Action in corresponding Japanese Patent Application for Invention No. 2018-519395, dated Jun. 25, 2019, and its English translation, 11 pgs.

\* cited by examiner

MOTION VECTOR PREDICTION USING PRIOR FRAME RESIDUAL

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Due to the large amount of data involved in video data, high performance compression is needed for transmission and storage. This often involves inter prediction using motion vectors.

SUMMARY

This disclosure relates in general to encoding and decoding visual data, such as video stream data, using motion vector prediction using a prior frame residual.

A method for encoding or decoding a video signal according to one aspect of this disclosure comprises generating a mask for a current block within a current frame from a residual that is a difference between pixel values of at least two frames other than the current frame, and encoding or decoding the current block by inter-prediction using the mask. The video signal includes frames defining a video sequence, each frame having blocks, and each block having pixels.

One aspect of an apparatus described herein is an apparatus for encoding or decoding a video signal, the video signal including frames defining a video sequence, each frame having blocks, and each block having pixels. The apparatus comprises a processor and a non-transitory memory that stores includes instruction causing the processor to perform a method including generating a mask for a current block within a current frame in the video sequence from a residual that is a difference between pixel values of at least two frames other than the current frame, and encoding or decoding the current block by inter-prediction using the mask.

Another aspect of an apparatus described herein is an apparatus for generating a mask for encoding or decoding a current block of a video signal, the video signal including frames defining a video sequence, each frame having blocks, and each block having pixels. The apparatus comprises a processor and a non-transitory memory that stores includes instruction causing the processor to perform a method including calculating a residual by subtracting pixel values within a first frame from pixel values within a second frame, each of the first frame and the second frame located before the current frame within the video sequence, applying a threshold value to pixel values for respective pixel locations within the residual to generate a threshold residual comprising pixels, each pixel within the threshold residual having one of a first value or a second value different from the first value, and expanding at least one of a first area of the threshold residual comprising pixels having the first value or a second area of the threshold residual comprising pixels having the second value to form the mask having a first contiguous portion of pixel locations with the first value and a second contiguous portion of pixel locations with the second value, the first contiguous portion and the second contiguous portion being non-overlapping, and a border between the first contiguous portion and the second contiguous portion extending between two edges of the mask; and wherein the mask has the same pixel dimensions as the current block.

These and other aspects of this disclosure are described in additional detail in the following detailed description, the appended claims and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

A video stream may be compressed by a variety of techniques to reduce bandwidth required transmit or store the video stream. A video stream can be encoded into a bitstream, which can involve compression, and then transmitted to a decoder that can decode or decompress the video stream to prepare it for viewing or further processing. Encoding a video stream can involve parameters that make trade-offs between video quality and bitstream size, where increasing the perceived quality of a decoded video stream can increase the number of bits required to transmit or store the bitstream.

One technique to achieve superior compression performance exploits spatial and temporal correlation of video signals through spatial and/or motion compensated prediction. Inter-prediction, for example, uses a motion vector to identify a previously-encoded and decoded block that resembles a current block to be encoded. By encoding the motion vector, and the difference between the two blocks, a decoder can re-create the current block. However, objects rarely fall on regular block boundaries within images. This results in coding efficiencies.

In contrast, the teachings herein describe the generation and use of an inter-predictor that does not require (e.g., square) blocks so as to better match objects within a frame. This can be implemented by using the residual of a prior frame to create a cliff mask for a block that allows two different motion vectors to be applied to the block. Further details are described after an initial discussion of the environment in which the teachings herein may be used.

Figure 1:
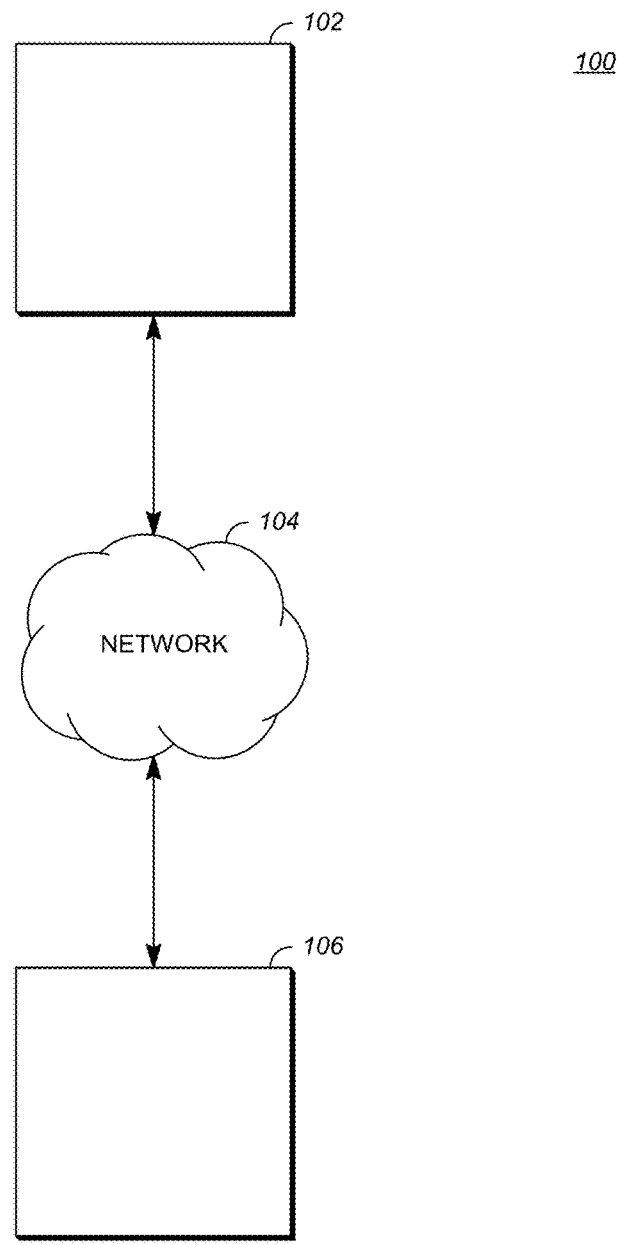
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
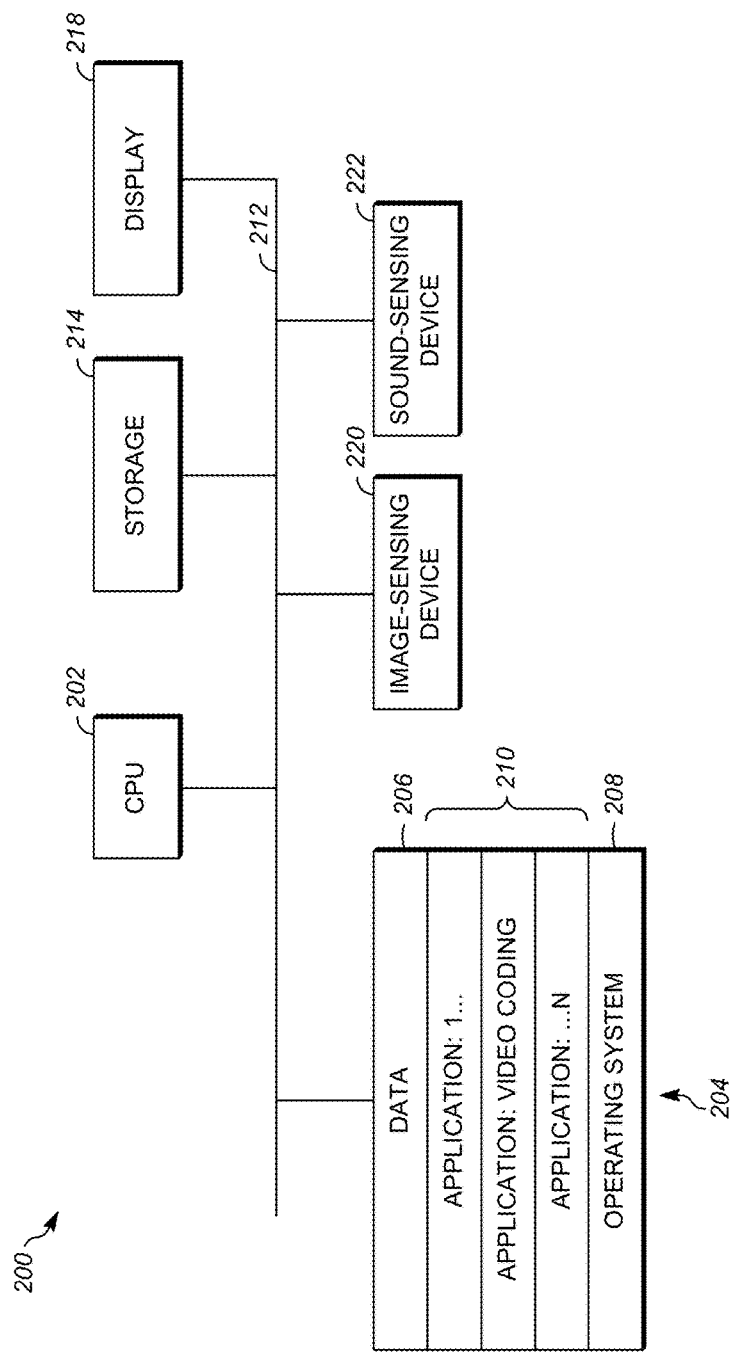
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext-Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
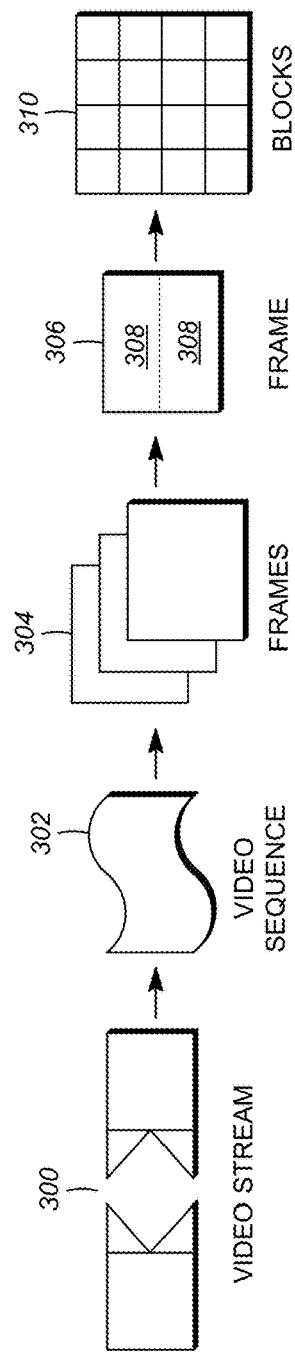
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in frame 306. The blocks 310 can also be arranged to include data from one or more planes 308 of pixel data. The blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein. The frame 306 may be partitioned according to the teachings herein as discussed in more detail below.

Figure 4:
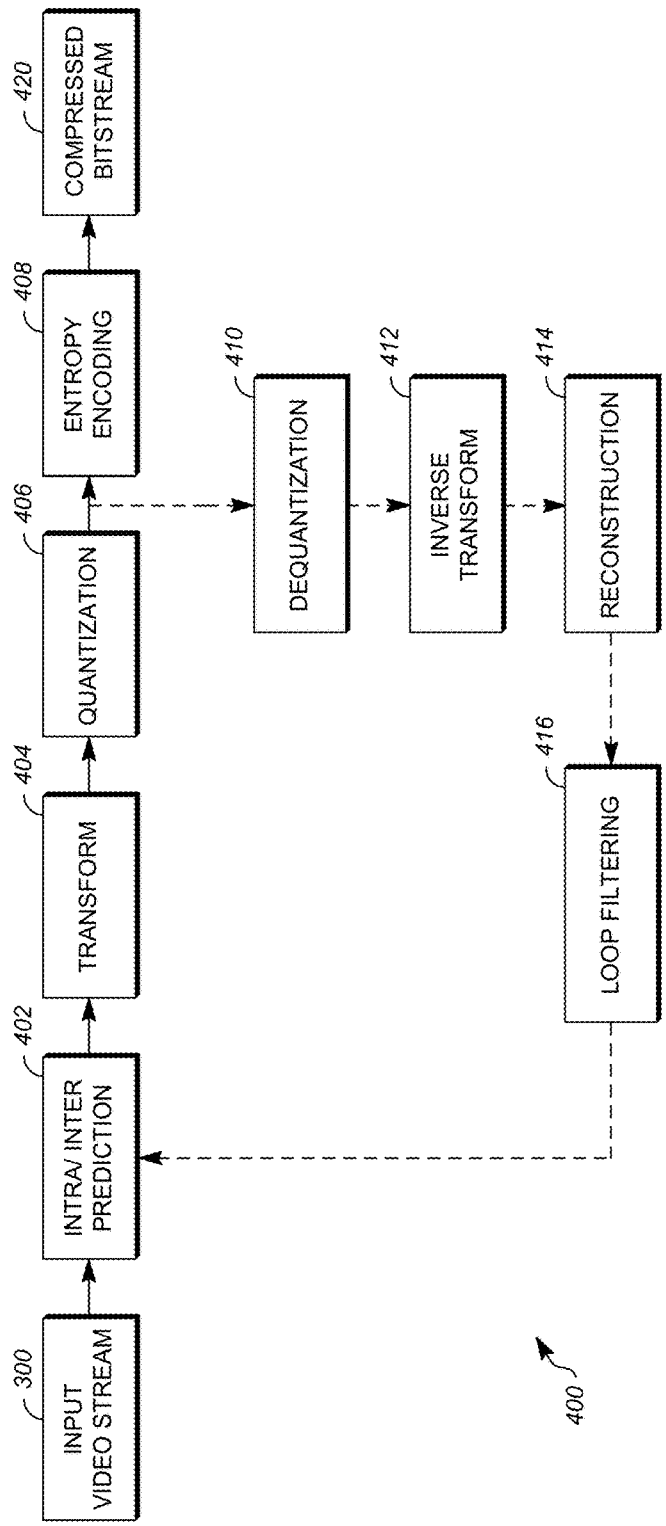
FIG. 4 is a block diagram of a video compression system according to an aspect of the teachings herein.

FIG. 4 is a block diagram of an encoder 400 in accordance with an implementation. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra prediction) or inter-frame prediction (also called inter prediction or inter-prediction herein). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames as discussed in more detail below.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
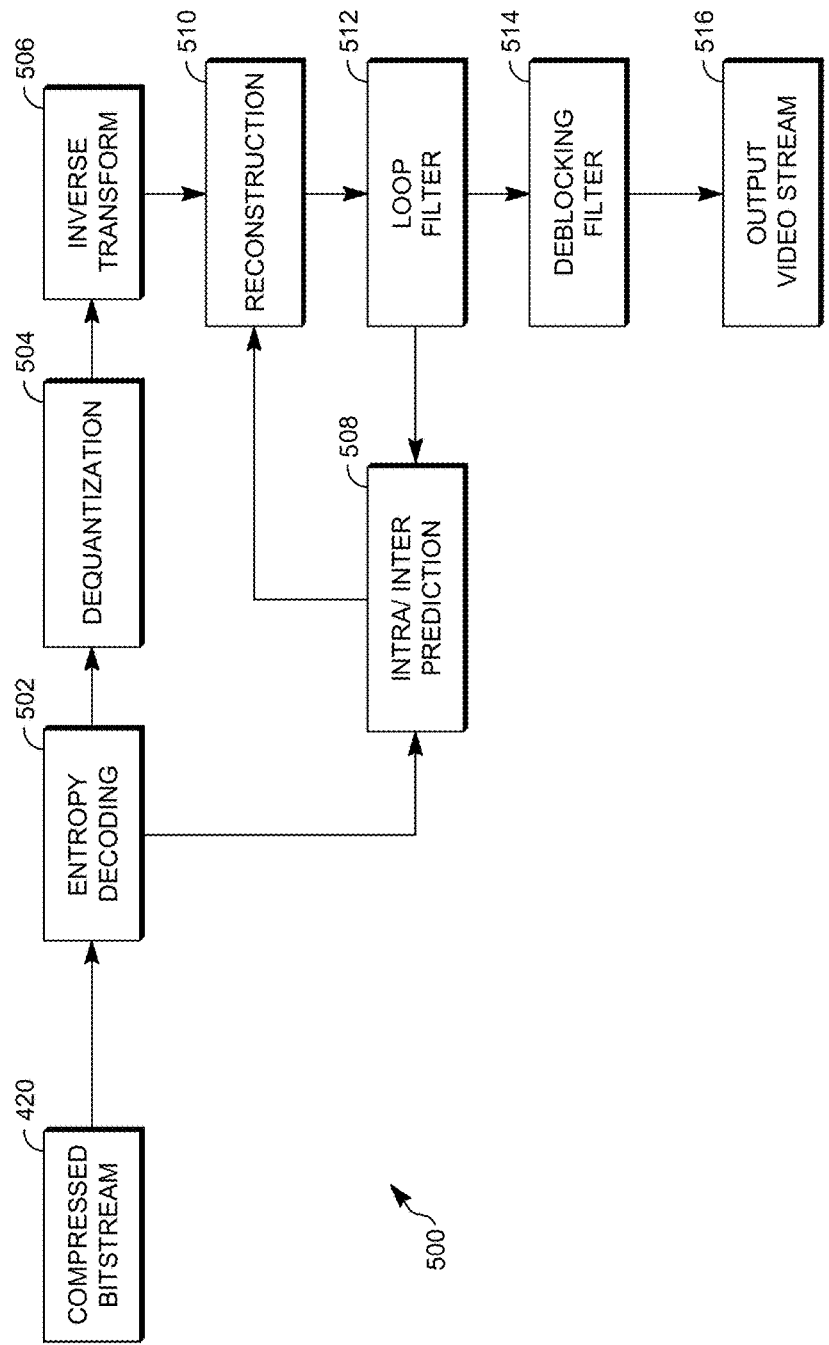
FIG. 5 is a block diagram of a video decompression system according to another aspect of the teachings herein.

FIG. 5 is a block diagram of a decoder 500 in accordance with another implementation. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514.

As mentioned briefly above, a block may be encoded or decoded by motion vector prediction using a prior frame residual. In general, a mask for the block is generated from a residual calculated between pixels of two frames (e.g., the last two frames before the current frame), and then the block is encoded or decoded by inter-prediction using the mask. In this way, a mask that allows two different motion vectors to be applied to a block can be used to better match objects within an image, improving video compression.

Figure 6:
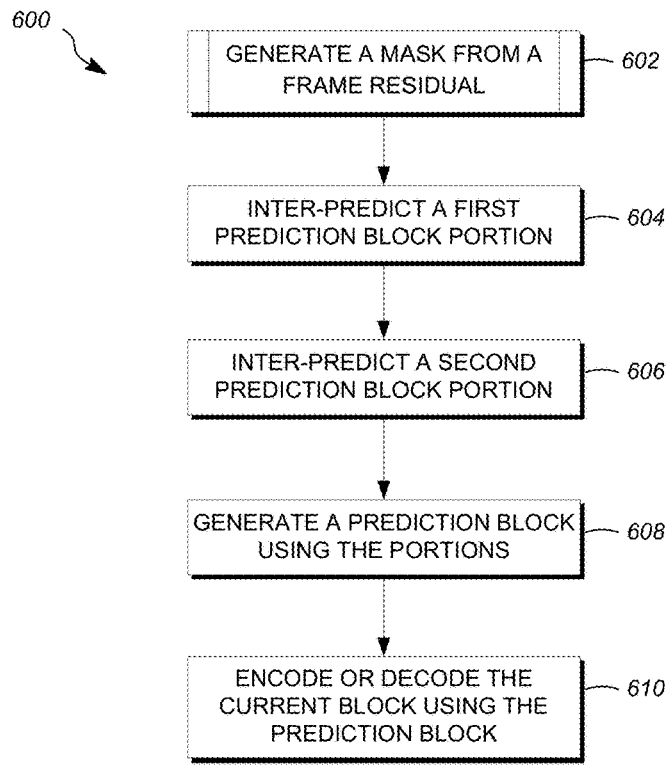
FIG. 6 is a flowchart diagram of a process for encoding or decoding a block by motion vector prediction using a prior frame residual according to one implementation of this disclosure.

FIG. 6 is a flowchart diagram of a process 600 for encoding or decoding a block by motion vector prediction using a prior frame residual according to one implementation of this disclosure. The method or process 600 can be implemented in a system such as the computing device 200 to aid the encoding or decoding of a video stream. The process 600 can be implemented, for example, as a software program that is executed by a computing device such as the transmitting station 102 or the receiving station 106. The software program can include machine-readable instructions that are stored in a memory such as the memory 204 that, when executed by a processor such as the CPU 202, cause the computing device to perform the process 600. The process 600 can also be implemented using hardware in whole or in part. As explained above, some computing devices may have multiple memories and multiple processors, and the steps or operations of the process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, the process 600 is depicted and described as a series of steps or operations. However, steps and operations in accordance with this disclosure can occur in various orders and/or concurrently. Additionally, steps or operations in accordance with this disclosure may occur with other steps or operations not presented and described herein. Furthermore, not all illustrated steps or operations may be required to implement a method in accordance with the disclosed subject matter. The process 600 may be repeated for each frame of the input signal.

When the process 600 is an encoding process, the input signal can be, for example, the input video stream 300. The input signal can be received by the computing performing the process 600 in any number of ways. For example, the input signal can be captured by the image-sensing device 220 or received from another device through an input connected to the bus 212. The input signal could be retrieved from the secondary storage 214 in another implementation. Other ways of receiving and other sources of the input signal are possible. For example, when the process 600 is a decoding process, the input signal can be an encoded bitstream such as the compressed bitstream 420.

Using the input signal, a mask is generated for a current block within a current frame in a video sequence from a residual that is a difference between pixel values of two frames other than the current frame at 602. In general, the mask can be generated by calculating a residual between two frames (e.g., two frames before the current frame), thresholding the residual, and cleaning up the thresholded residual. One small tap blur may optionally be added to the mask.

Figure 7:
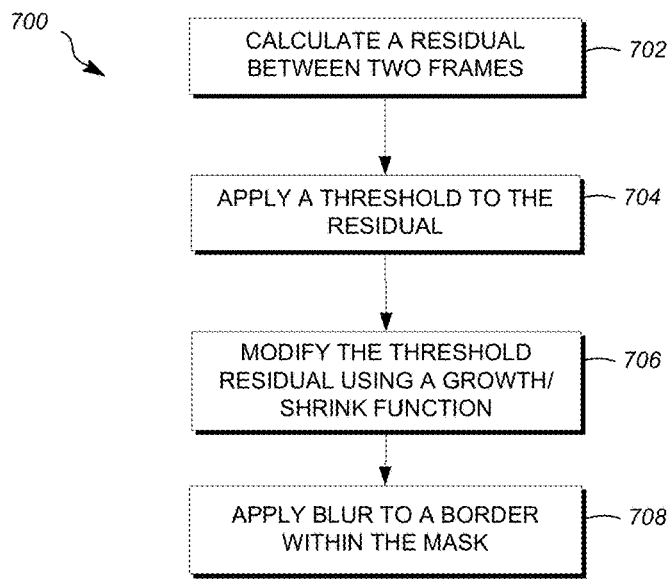
FIG. 7 is a flowchart diagram of a process for generating a mask using a prior frame residual according to one implementation of this disclosure.
Figure 8A:
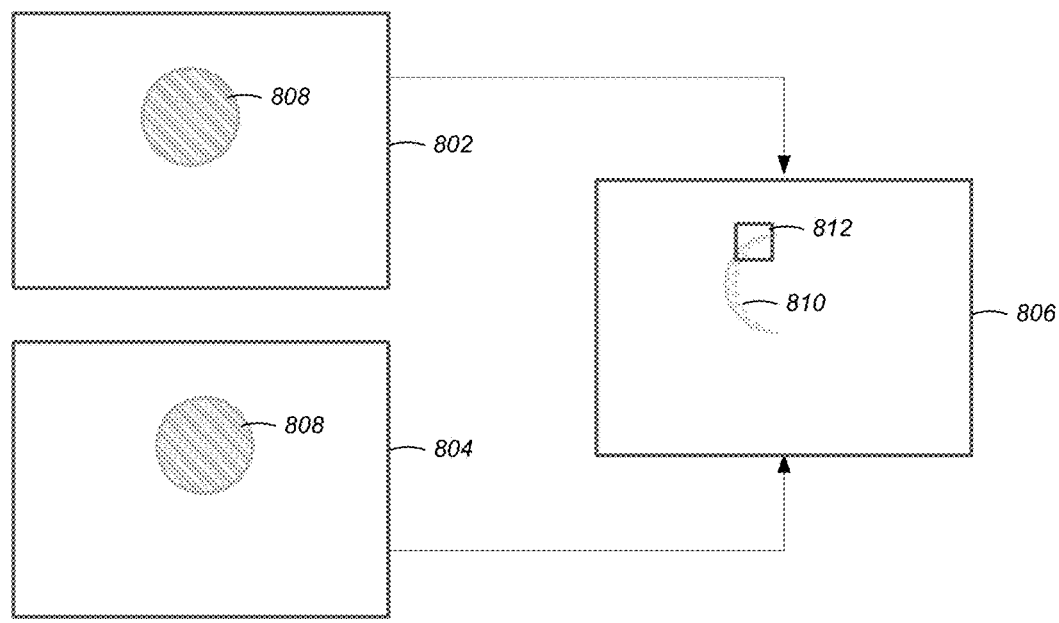
FIGS. 8A-8C are diagrams used to explain the process of FIG. 7.
Figure 8B:
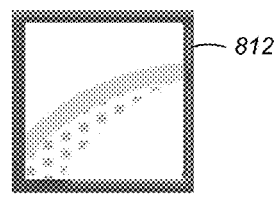
Figure 8C:
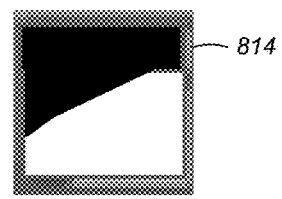

More specifically, FIG. 7 is a flowchart diagram of a process 700 for generating a mask using a prior frame residual according to one implementation of this disclosure. FIGS. 8A-8C are diagrams used to explain the process 700 of FIG. 7.

The method or process 700 can be implemented in a system such as the computing device 200 to aid the encoding or decoding of a video stream. The process 700 can be implemented, for example, as a software program that is executed by a computing device such as the transmitting station 102 or the receiving station 106. The software program can include machine-readable instructions that are stored in a memory such as the memory 204 that, when executed by a processor such as the CPU 202, cause the computing device to perform the process 700. The process 700 can also be implemented using hardware in whole or in part. As explained above, some computing devices may have multiple memories and multiple processors, and the steps or operations of the process 700 may in such cases be distributed using different processors and memories.

For simplicity of explanation, the process 700 is depicted and described as a series of steps or operations. However, steps and operations in accordance with this disclosure can occur in various orders and/or concurrently. Additionally, steps or operations in accordance with this disclosure may occur with other steps or operations not presented and described herein. Furthermore, not all illustrated steps or operations may be required to implement a method in accordance with the disclosed subject matter. The process 700 may be repeated for each block or each frame of the input signal.

In the process 700, generating the mask includes calculating a residual between two frames at 702. More specifically, the residual may be calculated by subtracting pixel values within a first frame from pixel values within a second frame or vice versa. The first and second frames may be located before the current frame within a video sequence defined by the input signal. The first and second frames may be adjacent frames, but more desirably they are separated by one or more frames within the video sequence and a defined amount of time. The defined amount of time is 200 ms in an example, but other values are possible. The pixel values may represent, for example, the luma components or chroma components of some or all of the pixel locations within the first and second frames.

In one implementation, the pixel values of pixels within the second frame are subtracted from the pixel values of collocated pixels within the first frame or vice versa. Collocated pixels have the same pixel coordinates within different frames. In one implementation, the pixels within the second frame and the collocated pixels within the first frame are collocated with pixels of the current block. Alternatively, the pixels within the second frame and the collocated pixels within the first frame are shifted by a motion vector relative to pixels of the current block. In some cases, the pixels in one of the first frame or the second frame may be collocated with the current frame, while the pixels in the other are shifted by a motion vector relative to the current block. Desirably, the pixel values are reconstructed pixel values obtained from the encoding and subsequent decoding process of an encoder, such as that described with respect to FIG. 4.

When the mask is generated in an encoding process, various techniques may be used to select the two frames. In one particularly simple implementation, the last two adjacent frames before the current frame are used. In another implementation, the last frame before the current frame may be selected, along with the frame most identified as a reference frame for the last frame. In other implementations, other frames may be selected so as to provide a residual for the mask generation process.

When the mask is generated in a decoding process, the two frames may be discerned from header information within the encoded bitstream as discussed in more detail below.

The residual can represent the entirety of a frame or only a portion of the frame. That is, the residual can be calculated for the entire dimensions of the frame or for only portions of the frame, such as a block of the frame. An example is shown in FIG. 8A. Therein, all pixel values of a first frame 802 are subtracted from collocated pixel values of a second frame 804. The result is the residual frame (or residual) 806. As can be seen from FIG. 8A, a round object 808, such as a ball, the moon, etc. is moving from a first position in the first frame 802 to a second position in the second frame 804. The residual 806 shows a crescent shape 810 that is the difference between pixel values of the first frame 802 and the second frame 804. In this case, the residual is calculated using the entire area of a frame. However, this calculation or subsequent steps of the process 700 may be performed on a portion of the frames, e.g., a block basis.

Generating the mask in the process 700 also includes, at 704, applying a threshold to the residual generated at 702. More specifically, the process 700 can include applying a threshold value to pixel values for respective pixel locations within the residual to generate a threshold residual. The threshold residual comprises pixels having the same dimensions as the residual or portion of the residual to which the threshold value is applied. In certain implementations, each pixel within the threshold residual has one of a first value or a second value different from the first value. The threshold value could be a positive value or a negative value, or could define a range of values.

In one implementation, applying the threshold value includes comparing a pixel value of respective pixel locations within the residual with the threshold value. Then, a first value is assigned to a same pixel location within the threshold residual when the pixel value is less than the threshold value. Alternatively, a second value is assigned to the same pixel location within the threshold residual when the pixel value is greater than the threshold value. For example, the first value may be zero, while the second value may be a maximum pixel value of 256. In one implementation, the second value is a value of 1 when the first value is a value of 0. The threshold value is not required to be any particular value as long as it captures changes in relative movement of an edge of object between the two frames while minimizing the capture of background or minimal changes in the values of the pixels representing the object. One value may be, for example, 75, and other values are possible. Unless a non-island-like residual across two borders of the threshold residual results from the thresholding, the threshold residual is not as useful as a mask. The value may be adjusted, or a decision may be made that the portion of the residual will not generate a mask that is as useful for prediction as another may be.

Referring to FIG. 8B, for example, a block 812 that is a portion of the residual 806 from FIG. 8A is shown. In the block 812, the edge and hatched areas represent the movement of the round object 808 (e.g., its edge) between the first frame 802 and the second frame 804. Applying the threshold value to the block 812 results in the edge and hatched areas being assigned a value of 1, while other areas are assigned a value of 1. For example, pixel locations within a new block (i.e., the threshold residual) that correspond to pixels within the block 812 having a value within the range of ±75 are assigned the value of 1, while other pixel locations within the threshold residual that correspond to pixels outside the range are assigned the value of 0. A non-island-like residual is seen across two borders, so the block 812 may generate a useful mask.

Referring again to FIG. 7, the process 700 for generating a mask may also include modifying the threshold residual. At 706, the threshold residual resulting from applying the threshold to the residual at 704 is modified using, for example, a growth and/or a shrink function on the threshold residual. That is, the threshold residual is cleaned up. In one example, the modification involves recursively applying a grow step only right and down within the threshold residual. In such an implementation, if any neighbor above or to the left is set (i.e., has a value of 1), then the current pixel is set (i.e., is converted to the value of 1). Speed of the recursive grow may be improved by working in larger "chunks" or portions of the threshold residual. For example, if any pixel is set at a bottom of a 4×4 pixel group, then all pixels within the group are set. Alternatively, a recursive grow function could be applied to grow the area having the other value within the threshold residual. Stated generally, modifying the threshold residual includes applying a growth function to expand an area defined by a minimum number of contiguous pixels having a first value of the two values based on values of pixels adjacent to the area.

This modification process of 706 described so far results in two generally contiguous areas having separate values. However, there can be areas where the continuity pixels of one value may be broken by individual pixels or groups of pixels of another value. Modifying the threshold residual at 706 may include additional steps to reduce these discontinuities. In one example, modifying the threshold residual includes applying a shrink function to remove an area defined by a maximum number of contiguous pixels having the first value that are surrounded by pixels having the second value of the two values or to remove an area defined by the maximum number of contiguous pixels having the second value that are surrounded by pixels having the first value. By removing the area, it means to change the values so that the first and second values form non-overlapping contiguous regions within a block or frame.

One example of a mask resulting from modifying a threshold residual is seen in FIG. 8C. The mask 814 is generated by thresholding the block 812 of FIG. 8B and modifying the resulting threshold residual using growth and shrink functions so that from a cliff mask with pixels on one side of a line all have a first value while pixels on the other side of the line all have a second value. While a cliff mask can be used (e.g., just black and white), an optional final step in generating a mask according to the process 700 of FIG. 7 includes applying a blur to a border within the mask. The value of a blur will be discussed in more detail below. At this point, it is noted that the blur results in values about the border that form a smoother transition between the areas. The blur may be one small tap blur formed according to conventional interpolation techniques. The process 700 ends once the mask is generated.

Once the mask is generated, it can be used for encoding or decoding a current block. Referring again to FIG. 6, one implementation of encoding or decoding the current block using the mask includes inter-predicting a first prediction block portion at 604, inter-predicting a second prediction block portion at 606, generating a prediction block using the portions at 608, and encoding or decoding the current block using the prediction block at 610.

When the process 600 is an encoding process, inter-predicting a first prediction block portion at 604 includes performing a first motion search within a reference frame for pixel values within a first contiguous portion of pixel locations of the current block using the mask. That is, a first motion vector that results in the best match for pixel values within the current block that are collocated with the first contiguous portion of the mask is found. The best match defines the first prediction block portion. Similarly, inter-predicting a second prediction block portion at 606 includes performing a second motion search within a reference frame for pixel values within a second contiguous portion of pixel locations of the current block using the mask. That is, a second motion vector that results in the best match for pixel values within the current block that are collocated with the second contiguous portion of the mask is found. The best match defines the second prediction block portion. Although the use of one reference frame is described, the search may be performed on more than one reference frame, and the best matches need not be in the same reference frame.

Generating a prediction block using the portions at 608 when the process 600 is an encoding process may include generating the prediction block by combining a result of the first motion search with a result of the second motion search using the mask. This combining may be achieved by combining the pixels values of the best matches into a single prediction block. For example, the prediction block may have pixels at positions within a first portion substantially coincident with first contiguous portion of the mask that have values corresponding to the first prediction block portion and pixels at positions within a second portion substantially coincident with the second continuous portion of the mask that have values corresponding to the second prediction block portion. At the border between the first portion and the second portion of the prediction block, the pixel values are a combination of pixel values in accordance with the blur. For example, the blur could have values between 1 and 0 of 0.75, 0.50 and 0.25 at the border. In this case, pixels at the border region between the two portions include a first set of pixels adjacent to the first portion that have values combining 75% of pixel values of the collocated pixels of the first portion with 25% of pixel values of the collocated pixels of the second portion, a second set of pixels adjacent to the second portion that have values combining 25% of pixel values of the collocated pixels of the first portion with 75% of pixel values of the collocated pixels of the second portion, and a third set of pixels between the first and second border regions that have values combining 50% of pixel values of the collocated pixels of the first portion with 50% of pixel values of the collocated pixels of the second portion. This is a simple example, and other techniques for applying the blurred mask to combine the two sets of pixels to generate a prediction block are within the skill of one in the art based on this disclosure.

It is worth noting that the mask can be modified for use in the inter-predictions of 604 and 606. That is, for example, the mask can be rotated. This changes the pixels selected for each search from the current block. Performing the motion searches thus comprise performing the first and second motion searches within the reference frame using the mask as rotated—that is, finding the best match for pixels from the current frame that are collocated with each of the separate contiguous portions of the rotated mask. Then, generating the prediction block at 608 similarly uses the mask as rotation to combine the best matches for the portions.

The mask can also be modified for use in the inter-predictions of 604 and 606 by shifting the mask by a motion vector. Namely, benefits of encoding a portion of the current frame corresponding to the size of the mask (whether all or a portion of the frame) may benefit from adjusting the border between the separate contiguous portions of the mask. The border may be adjusted by, for example, adjusting the pixel values so that the contiguous portion to one side of the mask increases in size and the contiguous portion on the opposite side of the mask decreases in size within the bounds of the mask by one of the motion vectors in a previous (e.g., the last) frame before the current frame. For example, the motion vector used to move the boundary, and hence shift the mask, could be a motion vector of a block of the last frame that is collocated with the current block being predicted.

Encoding the current block using the prediction block at 610 includes generating a residual for the current block, and encoding the residual into an encoded bitstream with information necessary for decoding the current block. For example, the encoding process could include processing the residual using the transform stage 404, the quantization stage 406, and the entropy encoding stage 408 as described with respect to FIG. 4. The information necessary for decoding the current block may include a mode indicator (sometimes called a flag) that indicates that the current block was encoded using a mask, indicators of which frames were used to generate the mask in the encoder (such as frame IDs), the motion vectors found as a result of the motion searches, the identification of the reference frame, and an indicator of any modification to the mask. For example, if the mask was rotated for use in the encoding process, the bitstream would include such an indication. The information may be included in frame, slice, segment, or block headers, and not all of the information need be transmitted in the same header. Moreover, not all information need be transmitted. For example, if there are no changes to the mask after it is generated (e.g., it is not rotated), there is no need to send an indicator of a modification. Further, if the past two frames are always used with encoding in this mask mode, there is no need to identify the two frames used within the bitstream. Other modifications are possible.

As may be understood from this description and the description of the encoding process of FIG. 4, the generation of a single mask may not result in the most efficient coding of a block. Therefore, the processing of FIG. 6 may be incorporated into one or more rate-distortion loops that perform inter-prediction using different masks (or the same masks rotated) so as to find the mask and motion vectors for encoding the current block with the lowest encoding cost (e.g., number of bits to encode).

When the process 600 is a decoding process, generating a mask from a frame residual at 602 is performed according to FIG. 7. According to one implementation, the frames used to calculate the residual are obtained from the encoded bitstream (e.g., by entropy decoding the header containing the information) when the mask mode is used. Alternatively, the frames may be known by the use of the mask mode. For example, if the prior two adjacent frames to the current frame are always used, there is no need to separately signal the identification of the frames to the decoder.

A first motion vector for inter-predicting the first prediction block portion at 604 and a second motion vector for inter-predicting the second prediction block portion at 606 may be obtained from a header within the bitstream. Inter-predicting the first prediction block portion at 604 may include generating a first reference block using the first motion vector and applying the mask to the first reference block to generate a first masked reference block (i.e., the first prediction block portion). Similarly, inter-predicting the second prediction block portion at 606 may include generating a second reference block using the second motion vector and applying the mask to the second reference block to generate a second masked reference block (i.e., the second prediction block portion). The prediction block is generated at 608 using the portions in a like manner as in described above with respect to the encoding process.

Decoding the current block using the prediction block at 610 includes decoding the residual for the current block from the bitstream, and adding the prediction block to the residual. For example, the decoding process could include processing the residual using the entropy decoding stage 502, the dequantization stage 504, and the inverse transform stage 506 as described with respect to FIG. 5. Then, the current block could be reconstructed at reconstructions stage 510 as also described with respect to FIG. 5.

Pixel prediction is used to reduce the amount of data encoded within a bitstream. One conventional technique is to copy blocks of pixels from prior encoded frames using a motion vector. In actuality, objects do not often fall on regular block boundaries. According to the teachings herein, a predictor (e.g., a prediction block) that better follows the edge shapes of objects and thus may improve video compression results.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal using a computing device, the video signal including frames defining a video sequence, the frames having blocks formed of pixels, the method comprising:
    generating a mask for a current block within a current frame in the video sequence by:
        calculating a residual that is a difference between pixel values of at least two frames in the video sequence other than the current frame, the pixel values in each of the at least two frames arranged with the same pixel dimensions as the current block; and
        defining a first contiguous portion of pixel locations and a second contiguous portion of pixel locations for the mask based on pixel values of the residual by:
            applying, for each pixel location of the residual, a threshold value to the corresponding pixel value at the pixel location to assign a value to the pixel location within a threshold residual; and
            modifying the threshold residual to generate the mask including expanding at least one of a first area of the threshold residual comprising pixel locations having a first value based on the applying or a second area of the threshold residual comprising pixel locations having a second value based on the applying, the first value being different from the second value, the mask having the same pixel dimensions as the current block, the first contiguous portion and the second contiguous portion being non-overlapping, and a border between the first contiguous portion and the second contiguous portion extending between two edges of mask; and
    encoding the current block using the mask by inter-predicting pixels of the current block corresponding to the first contiguous portion of pixel locations of the mask and by inter-predicting pixels of the current block corresponding to the second contiguous portion of pixel locations of the mask.

2. The method of claim 1, wherein generating the mask comprises:
    calculating the residual by subtracting pixel values within a first frame from pixel values within a second frame, the first frame and the second frame being located before the current frame within the video sequence and the first frame and the second frame spaced apart from each other by a plurality of frames and a defined amount of time.

3. The method of claim 1, wherein encoding the current block comprises:
    inter-predicting the pixels of the current block corresponding to the first contiguous portion of pixel locations of the mask by performing a first motion search within a reference frame for pixel values of the pixels of the current block corresponding to the first contiguous portion of pixel locations of the mask;
    inter-predicting the pixels of the current block corresponding to the second contiguous portion of pixel locations of the mask by performing a second motion search within the reference frame for pixel values of the pixels of the current block corresponding to the second contiguous portion of pixel locations of the mask; and
    generating a prediction block by combining a result of the first motion search with a result of the second motion search based on the border of the mask.

4. The method of claim 1, wherein applying the threshold value comprises:
    comparing a pixel value of respective pixel locations within the residual with the threshold value;
    assigning the first value to a same pixel location within the threshold residual when the pixel value is less than the threshold value; and
    assigning the second value to the same pixel location within the threshold residual when the pixel value is greater than the threshold value.

5. The method of claim 1, wherein modifying the threshold residual comprises:
    applying a growth function to expand an area defined by a minimum number of contiguous pixel locations having the first value based on values of pixels adjacent to the area.

6. The method of claim 1, wherein modifying the threshold residual comprises:
    applying a shrink function to remove an area defined by a maximum number of contiguous pixel locations having the first value that are surrounded by pixel locations having the second value.

7. The method of claim 1, wherein the at least two frames include a first frame and a second frame, the method further comprising:
    calculating the residual by subtracting the pixel values of pixels within a second frame from the pixel values of collocated pixels within a first frame, and wherein the border of the mask is shifted by a motion vector before encoding the current block.

8. The method of claim 1, further comprising:
    rotating the mask wherein encoding the current block comprises:
    inter-predicting the pixels of the current block corresponding to the first contiguous portion of pixel locations of the mask by performing a first motion search within a reference frame using the mask as rotated;
    inter-predicting the pixels of the current block corresponding to the second contiguous portion of pixel locations of the mask by performing a second motion search within the reference frame using the mask as rotated; and combining a block found by the first motion search with a block found by the second motion search based on the border of the mask to generate a prediction block for encoding the current block.

9. An apparatus for decoding a video signal, the video signal including frames defining a video sequence, the frames having blocks, and the blocks formed of pixels, the apparatus comprising:
  a processor; and
  a non-transitory memory that stores includes instruction causing the processor to perform a method including:
  generating a mask for a current block within a current frame in the video sequence by:
    calculating a residual that is a difference between pixel values of at least two frames in the video sequence other than the current frame, the pixel values in each of the at least two frames arranged with the same pixel dimensions as the current block; and
    defining a first contiguous portion of pixel locations and a second contiguous portion of pixel locations for the mask based on pixel values of the residual by:
      applying, for each pixel location of the residual, a threshold value to the corresponding pixel value at the pixel location to assign a value to the pixel location within a threshold residual; and
      expanding at least one of a first area of the threshold residual comprising pixels having a first value based on the applying or a second area of the threshold residual comprising pixels having a second value based on the applying, the first value being different from the second value, the mask having the same pixel dimensions as the current block, the first contiguous portion and the second contiguous portion being non-overlapping, and a border between the first contiguous portion and the second contiguous portion extending between two edges of the mask; and
    decoding the current block using the mask by inter-predicting pixels of the current block corresponding to the first contiguous portion of pixel locations of the mask and by inter-predicting pixels of the current block corresponding to the second contiguous portion of pixel locations of the mask.

10. The apparatus of claim 9, the instructions further comprising instructions for generating the mask by:
  calculating the residual as a difference between pixel values within a first frame and pixel values within a second frame in the video sequence; wherein the applying comprises:
    comparing a pixel value of respective pixel locations within the residual with the threshold value;
    assigning the first value to a same pixel location within a threshold residual when the pixel value is less than the threshold value; and
    assigning the second value to the same pixel location within the threshold residual when the pixel value is greater than the threshold value.

11. The apparatus of claim 10, the instructions further comprising instructions for:
  modifying the mask by modifying values of pixels about the border between the first contiguous portion and the second contiguous portion before using the mask; and
  generating a prediction block including pixels of a first block resulting from a first motion vector associated with the first contiguous portion of pixel locations coincident with the first contiguous portion of pixel locations, pixels of a second block resulting from a second motion vector associated with the second contiguous portion of pixel locations coincident with the second contiguous portion of pixel locations, and combined values of pixels of the first block and the second block coincident with the pixels about the border between the first contiguous portion and the second contiguous portion.

12. The apparatus of claim 9, the instructions further comprising instructions for:
  reading a first signal within an encoded bitstream associated with the current block of the current frame indicating that the current block was encoded using a mask, wherein decoding the current block comprises:
    inter-predicting pixels of the current block corresponding to the first contiguous portion of pixel locations of the mask by generating a first prediction block within a reference frame using a first motion vector;
    inter-predicting pixels of the current block corresponding to the second contiguous portion of pixel locations of the mask by generating a second prediction block within a reference frame using a second motion vector; and
    combining the first prediction block with the second prediction block based on the border of the mask to produce a combined prediction block for the current block; and
    decoding the current block using the combined prediction block.

13. The apparatus of claim 12, the instructions further comprising instructions for:
  reading at least a second signal within the encoded bitstream associated with the current block indicating a first frame and a second frame for generating the mask;
  reading a third signal from the encoded bitstream indicating the first motion vector; and
  reading a fourth signal from the encoded bitstream indicating the second motion vector.

14. The apparatus of claim 13, wherein the pixel values of the first frame and of the second frame comprise reconstructed pixel values generated by decoding the first frame and the second frame.

15. An apparatus for generating a mask for inter-prediction of a current block of a video signal, the video signal including frames defining a video sequence, the frames having blocks formed of pixels, the apparatus comprising:
  a processor; and
  a non-transitory memory that stores includes instruction causing the processor to perform a method including:
    calculating a residual by subtracting pixel values within a first frame from pixel values within a second frame, each of the first frame and the second frame located before a current frame within the video sequence;
    applying a threshold value to pixel values for respective pixel locations within the residual to generate a threshold residual comprising pixels by comparing, for each pixel location of the residual, the threshold value to the corresponding pixel value at the pixel location to assign one of a first value or a second value different from the first value to the pixel location within a threshold residual; and
    expanding at least one of a first area of the threshold residual comprising pixels having the first value or a second area of the threshold residual comprising pixels having the second value to form the mask having a first contiguous portion of pixel locations with the first value and a second contiguous portion of pixel locations with the second value, the first contiguous portion and the second contiguous portion being non-overlapping, and a border between the first contiguous portion and the second contiguous portion extending between two edges of the mask; and wherein the mask is used for inter-prediction of pixels of the current block corresponding to the first contiguous portion of pixel locations of the mask and for inter-prediction of pixels of the current block corresponding to the second contiguous portion of pixel locations of the mask.

16. The apparatus of claim 15, the instructions further comprising instructions for:
applying a blur to pixels about the border, the blur defining a region of pixels with values between the first value and the second value.

17. The apparatus of claim 15, the instructions further comprising instructions for:
after expanding the at least one of the first area or the second area, applying a shrink function to remove an area defined by a maximum number of contiguous pixels having the first value that are surrounded by pixels having the second value to form the mask.

18. The apparatus of claim 15, the instructions further comprising instructions for applying the threshold value by:
assigning the first value to the pixel location within the threshold residual when the corresponding pixel value within the residual is less than the threshold value; and
assigning the second value to the pixel location within the threshold residual when the corresponding pixel value within the residual is greater than the threshold value.

19. The apparatus of claim 9, wherein the instructions further comprise instructions for:
receiving an encoded bitstream including a first motion vector, a second motion vector, and an indicator that a mask mode was used to encode the current block; and
after generating the mask:
applying the mask to a first reference block resulting from the first motion vector to generate a first masked reference block corresponding to the first contiguous portion of pixel locations;
applying the mask to a second reference block resulting from the second motion vector to generate a second masked reference block corresponding to the second contiguous portion of pixel locations; and
combining the first masked reference block and the second masked reference block to generate a prediction block, wherein:
inter-predicting the current block using the mask comprises decoding the current block using the prediction block.

* * * * *